US012608025B2

(12) United States Patent
Yamashita et al.

(10) Patent No.: US 12,608,025 B2
(45) Date of Patent: *Apr. 21, 2026

(54) SERVER DEVICE

(71) Applicant: HONDA MOTOR CO., LTD., Tokyo (JP)

(72) Inventors: Akifumi Yamashita, Wako (JP); Ryota Hisada, Tokyo (JP); Takuya Kanisawa, Wako (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

This patent is subject to a terminal disclaimer.

(21) Appl. No.: 18/549,712

(22) PCT Filed: Mar. 12, 2021

(86) PCT No.: PCT/JP2021/010179
§ 371 (c)(1),
(2) Date: Sep. 8, 2023

(87) PCT Pub. No.: WO2022/190382
PCT Pub. Date: Sep. 15, 2022

(65) Prior Publication Data

US 2024/0302847 A1 Sep. 12, 2024

(51) Int. Cl.
*G05D 1/698* (2024.01)
*A01D 34/00* (2006.01)
(Continued)

(52) U.S. Cl.
CPC ......... *G05D 1/6987* (2024.01); *A01D 34/008* (2013.01); *G05D 1/2246* (2024.01);
(Continued)

(58) Field of Classification Search
CPC ............... G05D 1/6987; G05D 1/6482; G05D 2105/15; G05D 2107/23; G05D 1/2246;
(Continued)

(56) References Cited

U.S. PATENT DOCUMENTS

2016/0366813 A1    12/2016  Haneda et al.
2017/0020064 A1*    1/2017  Doughty ................ A01G 25/09
(Continued)

FOREIGN PATENT DOCUMENTS

CN          208807093 U   *  5/2019
JP        2017-010161 A      1/2017
(Continued)

OTHER PUBLICATIONS

WO-2020136812-A1 original and machine translation (Year: 2020).*
(Continued)

*Primary Examiner* — Kito R Robinson
*Assistant Examiner* — Zachary E. F. Glade
(74) *Attorney, Agent, or Firm* — Rankin, Hill & Clark LLP

(57) ABSTRACT

A server device includes an area setting unit that sets a first area in which a first lawnmower executes first lawn-mowing work in a work area and a second area in which a second lawnmower executes second lawn-mowing work in the work area, a time calculation unit that obtains a first time necessary for the first lawnmower to execute the first lawn-mowing work in the first area and a second time necessary for the second lawnmower to execute the second lawn-mowing work in the second area, a machine number calculation unit that obtains the number of first lawnmowers and the number of second lawnmowers based on the first time and the second time, and a notification unit that notifies the number of first lawnmowers and the number of second lawnmowers to a smartphone. Consequently, a user can (Continued)

check the number of first lawnmowers and the number of second lawnmowers.

17 Claims, 4 Drawing Sheets

(51) Int. Cl.

| | |
|---|---|
| *A01D 101/00* | (2006.01) |
| *G05D 1/224* | (2024.01) |
| *G05D 1/648* | (2024.01) |
| *G05D 105/15* | (2024.01) |
| *G05D 107/20* | (2024.01) |
| *G05D 109/10* | (2024.01) |
| *G06Q 10/0631* | (2023.01) |

(52) U.S. Cl.
CPC ......... *G05D 1/6482* (2024.01); *G05D 1/6484* (2024.01); *G06Q 10/0631* (2013.01); *G06Q 10/06311* (2013.01); *A01D 2101/00* (2013.01); *G05D 2105/15* (2024.01); *G05D 2107/23* (2024.01); *G05D 2109/10* (2024.01)

(58) Field of Classification Search
CPC ............. G05D 1/6484; G05D 2109/10; A01D 34/008; A01D 2101/00; G06Q 10/06311; G06Q 10/0631
See application file for complete search history.

(56) References Cited

U.S. PATENT DOCUMENTS

| | | | |
|---|---|---|---|
| 2017/0285630 A1* | 10/2017 | Yamamura | .............. B60L 53/36 |
| 2019/0230850 A1* | 8/2019 | Johnson | ............... G05D 1/0287 |
| 2021/0076563 A1 | 3/2021 | Andriolo et al. | |
| 2021/0125133 A1* | 4/2021 | Person | ........... G06Q 10/063116 |
| 2021/0295230 A1 | 9/2021 | Dobashi et al. | |
| 2022/0295696 A1 | 9/2022 | Holgersson et al. | |
| 2024/0168496 A1* | 5/2024 | Yamashita | ............... G05D 1/69 |

FOREIGN PATENT DOCUMENTS

| | | | | |
|---|---|---|---|---|
| JP | 2017-176115 A | 10/2017 | | |
| JP | 2018-101410 A | 6/2018 | | |
| WO | 2019/185929 A1 | 10/2019 | | |
| WO | WO-2020136812 A1 * | 7/2020 | ............. | G06V 20/58 |
| WO | WO-2021034257 A1 * | 2/2021 | .......... | G05D 1/6484 |
| WO | WO-2021173881 A1 * | 9/2021 | ............. | G01S 19/41 |

OTHER PUBLICATIONS

Holgersson WO-2021034257 original and machine translation (Year: 2021).*

Liu CN-208807093-U original and machine translation (Year: 2019).*

Extended European Search Report dated Mar. 20, 2024 issued in corresponding European application No. EP 21 93 0232 (9 pages).

European Office Action dated Jan. 23, 2025 issued in corresponding Eropean application No. 21 930 232.0; 4 pages.

English translation of the International Preliminary Report on Patentability issued Sep. 21, 2023 in the corresponding International application No. PCT/JP2021/010179 (6 pages).

International Search Report, International Application No. PCT/JP2021/010179, Date of mailing: Apr. 27, 2021, 2 pages.

Written Opinion of the International Searching Authority dated Apr. 27, 2021 filed in PCT/JP2021/010179, 4 pages.

* cited by examiner

FIG.3

| CASE | FIRST MACHINE NUMBER | SECOND MACHINE NUMBER | WORK TIME (MINUTES) | WORKER NUMBER | COST (TEN THOUSAND YEN) |
|------|------|------|------|------|------|
| | NM1 | NM2 | TW | NP | CT |
| A | 2 | 1 | 30 | 2 | 4 |
| B | 1 | 1 | 60 | 2 | 5 |
| C | 4 | 2 | 15 | 3 | 6 |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |

SERVER DEVICE

TECHNICAL FIELD

The present invention relates to a server device that notifies a terminal device of the number of first work machines and the number of second work machines, the first work machines and second work machines being used in gardening work.

BACKGROUND ART

An autonomously traveling work machine has been known which performs work while autonomously traveling.

For example, as one example of the autonomously traveling work machine, Patent Literature 1 discloses a lawnmower which is driven by a battery, autonomously travels in a lawn ground region, and executes lawn-mowing work.

CITATION LIST

Patent Literature

[Patent Literature 1]
Japanese Patent Laid-Open No. 2017-10161

SUMMARY OF INVENTION

Technical Problem

A lawnmower disclosed in Patent Literature 1 can conduct unmanned lawn-mowing work. Further, in order to more efficiently conduct lawn-mowing work, lawn-mowing work may be conducted by plural lawnmowers. Further, a lawnmower with a larger size and a higher speed can improve work efficiency but is unsuitable for detailed work.

Consequently, it is preferable to conduct lawn-mowing work by using lawnmowers with small sizes and low speeds and lawnmowers with large sizes and high speeds. However, it is difficult for a user to decide the number of lawnmowers with small sizes and low speeds and the number of lawnmowers with large sizes and high speeds. Note that the lawnmower with a small size and a low speed corresponds to one example of "first work machine", and the lawnmower with a large size and a high speed corresponds to one example of "second work machine".

An object of the present invention is to provide a server device that is capable of notifying the number of first work machines and the number of second work machines to a terminal device.

Solution to Problem

A server device according to the present invention includes: an area setting unit which sets a first area in which a first work machine executes first gardening work in a work area and a second area in which a second work machine executes second gardening work in the work area; a time calculation unit which obtains a first time necessary for the first work machine to execute the first gardening work in the first area and a second time necessary for the second work machine to execute the second gardening work in the second area; and a notification unit which notifies the first time and the second time to a terminal device connected to be capable of communication based on the first time and the second time.

As for the server device according to the present invention, in the server device, the second work machine has a larger size than the first work machine.

As for the server device according to the present invention, in the server device, safety information is stored which indicates safety of work of the first work machine and the second work machine, and the first work machine is a work machine with higher safety than the second work machine.

As for the server device according to the present invention, in the server device, the second work machine executes the second gardening work while autonomously traveling.

As for the server device according to the present invention, in the server device, the area setting unit sets the first area and sets an area except the first area in the work area as the second area.

As for the server device according to the present invention, in the server device, the area setting unit sets the first area based on an instruction by a user about a map of the work area, the map being displayed on the terminal device.

As for the server device according to the present invention, in the server device, position information of an obstacle arranged in the work area is stored, and the area setting unit sets the first area based on the position information of the obstacle.

As for the server device according to the present invention, in the server device, the area setting unit sets the second area and sets an area except the second area in the work area as the first area.

As for the server device according to the present invention, in the server device, the area setting unit determines whether or not the second work machine is capable of passing through the second area based on a size of the second work machine, and in a case where a determination is made that the second work machine is not capable of passing through the second area, the area setting unit sets the second area through which the second work machine is determined to be not capable of passing as the first area.

As for the server device according to the present invention, in the server device, the first work machine executes the first gardening work while autonomously traveling, the second work machine executes the second gardening work while autonomously traveling, and the time calculation unit calculates the first time based on an area of the first area and calculates the second time based on an area of the second area.

As for the server device according to the present invention, in the server device, the first work machine executes the first gardening work while a worker is moving, and the time calculation unit calculates the first time based on a moving time of the worker.

As for the server device according to the present invention, in the server device, the time calculation unit corrects the first time based on complexity of the first area and corrects the second time based on complexity of the second area, and the complexity denotes an extent of complexness.

As for the server device according to the present invention, in the server device, the time calculation unit corrects the first time based on a quantity of inclinations in the first area and corrects the second time based on a quantity of inclinations in the second area.

As for the server device according to the present invention, in the server device, the server device includes a machine number calculation unit which obtains the number of first work machines and the number of second work machines based on the first time and the second time, and the notification unit notifies the number of first work machines and the number of second work machines to the terminal device.

As for the server device according to the present invention, in the server device, the machine number calculation unit obtains the number of first work machines and the number of second work machines such that gardening work is completed in a shorter time between the first time and the second time.

As for the server device according to the present invention, in the server device, the machine number calculation unit sets plural combinations of the number of first work machines and the number of second work machines, and the notification unit causes the terminal device to display the plural combinations while aligning the plural combinations in predetermined order.

As for the server device according to the present invention, in the server device, the machine number calculation unit calculates a work time corresponding to each of the plural combinations, the notification unit causes the terminal device to display the work time while associating the work time with each of the plural combinations, and the work time denotes a time necessary for completion of the gardening work.

As for the server device according to the present invention, in the server device, the machine number calculation unit calculates a cost corresponding to each of the plural combinations, and the notification unit causes the terminal device to display the cost while associating the cost with each of the plural combinations.

As for the server device according to the present invention, in the server device, the machine number calculation unit calculates the number of workers which corresponds to each of the plural combinations, and the notification unit causes the terminal device to display the number of workers while associating the number of workers with each of the plural combinations.

As for the server device according to the present invention, in the server device, the terminal device is retained by a worker who performs gardening work, and the notification unit causes the terminal device to display the first area and the second area in mutually different manners.

As for the server device according to the present invention, in the server device, the terminal device is retained by a worker who performs gardening work, and in a case where the terminal device is positioned in the second area, the notification unit notifies a warning to the terminal device.

Advantageous Effects of Invention

A server device according to the present invention can notify the number of first work machines and the number of second work machines to a terminal device.

BRIEF DESCRIPTION OF DRAWINGS

FIG. 3 is a diagram illustrating one example of a display screen which is displayed by a smartphone.

DESCRIPTION OF EMBODIMENTS

An embodiment will hereinafter be described with reference to drawings.

Figure 1:
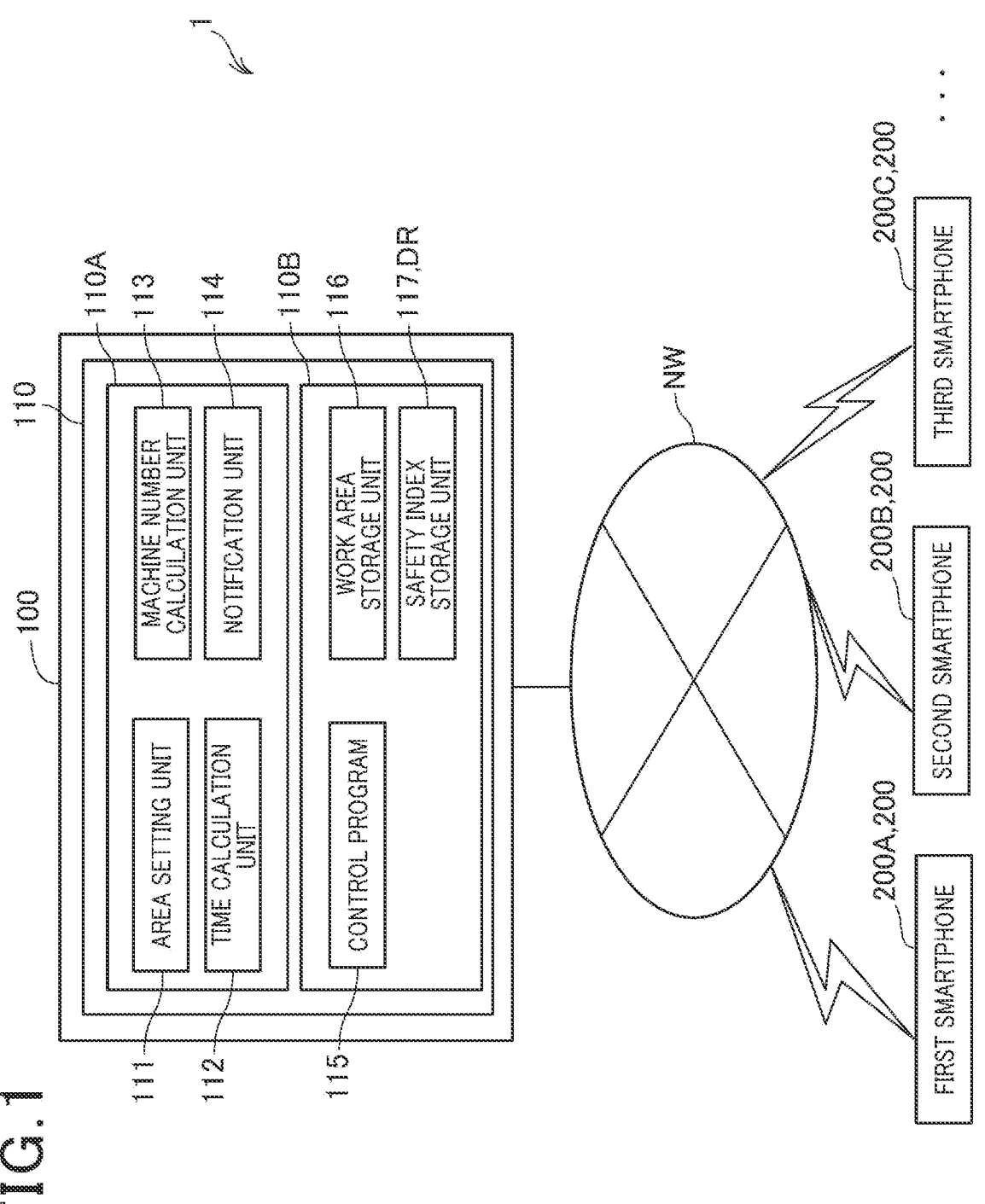
FIG. 1 is a diagram illustrating one example of a server device according to the present embodiment.

FIG. 1 is a diagram illustrating one example of a server device 100 according to the present embodiment.

As illustrated in FIG. 1, a gardening assistance system 1 includes the server device 100 and smartphones 200.

The server device 100 is connected with the smartphones 200 via a network NW to be capable of communication with those. The network NW is the Internet, for example.

In the present embodiment, a description will be made about a case where the network NW is the Internet, but this is not restrictive. The network NW may be a LAN (local area network) or may be a WAN (wide area network).

The smartphones 200 include a first smartphone 200A, a second smartphone 200B, and a third smartphone 200C. The first smartphone 200A is carried by a first user, the second smartphone 200B is carried by a second user, and the third smartphone 200C is carried by a third user.

Each of the first smartphone 200A, the second smartphone 200B, and the third smartphone 200C has generally the same configuration. Accordingly, in the following descriptions, in a case where the first smartphone 200A, the second smartphone 200B, and the third smartphone 200C are not distinguished from each other, each of those may be denoted as smartphone 200.

Each of the first smartphone 200A, the second smartphone 200B, and the third smartphone 200C is connected with the server device 100 to be capable of communication by wireless communication such as Wi-Fi (registered trademark), for example. Further, each of the first smartphone 200A, the second smartphone 200B, and the third smartphone 200C includes an LCD (liquid crystal display).

While designating a work area AR, each of the first smartphone 200A, the second smartphone 200B, and the third smartphone 200C requests the server device 100 to notify the number of first lawnmowers MW1 and the number of second lawnmowers MW2, the first lawnmowers MW1 and second lawnmowers MW2 being necessary for lawn-mowing work in the work area AR, a work time TW, and so forth. Further, each of the first smartphone 200A, the second smartphone 200B, and the third smartphone 200C receives, from the server device 100, information such as the number of first lawnmowers MW1, the number of second lawnmowers MW2, and the work time TW and displays, on the LCD, an image which represents the number of lawnmowers MW, the work time TW, and so forth.

The work area AR, the first lawnmower MW1, the second lawnmower MW2, and the work time TW will be described later in a description about a configuration of the server device 100.

The smartphone 200 corresponds to one example of "terminal device".

The server device 100 includes a control unit 110. The control unit 110 controls a process by the server device 100. The control unit 110 includes a processor 110A and a memory 110B.

The processor 110A is configured with a CPU (central processing unit), an MPU (micro-processing unit), or the like, for example.

The memory 110B includes a RAM (random access memory), a ROM (read-only memory), or the like, for example. Further, the memory 110B may include an HDD (hard disk drive), an SSD (solid state drive), or the like.

The memory 110B stores a control program 115.

The control unit 110 includes an area setting unit 111, a time calculation unit 112, a machine number calculation unit 113, a notification unit 114, and a work area storage unit 116.

Specifically, the processor 110A executes the control program 115 and thereby functions as the area setting unit 111, the time calculation unit 112, the machine number calculation unit 113, and the notification unit 114. Further, the processor 110A executes the control program 115 and thereby causes the memory 110B to function as the work area storage unit 116 and a safety index storage unit 117.

The work area storage unit 116 stores information about a target work area AR in which lawn-mowing work as one example of gardening work is executed. The work area storage unit 116 stores a plan view of the work area AR and inclination information, for example. The inclination information includes an inclination angle of a lawn surface included in the work area AR. As described later with reference to FIG. 2, the work area AR includes trees TR and benches BN, for example.

Further, the work area storage unit 116 stores position information of an obstacle arranged in the work area AR.

In the present embodiment, a description will be made about a case where lawn-mowing work is executed as one example of gardening work.

The area setting unit 111 sets a first area AR1 in which the first lawnmower MW1 executes first lawn-mowing work in the work area AR and a second area AR2 in which the second lawnmower MW2 executes second lawn-mowing work in the work area AR. The area setting unit 111 accepts the work area AR from the smartphone 200, for example.

The work area AR denotes an area in which the lawn-mowing work is executed.

The first area AR1 denotes an area in which the first lawn-mowing work is executed by the first lawnmower MW1. The second area AR2 denotes an area in which the second lawn-mowing work is executed by the second lawnmower MW2. The first lawn-mowing work is lawn-mowing work which is executed by the first lawnmower MW1, and the second lawn-mowing work is lawn-mowing work which is executed by the second lawnmower MW2.

The first lawn-mowing work corresponds to one example of "first gardening work".

The second lawn-mowing work corresponds to one example of "second gardening work".

The first lawnmower MW1 executes the first lawn-mowing work. The first lawn-mowing work is detailed lawn-mowing work for a part around a trunk of the tree TR, a part below and around the bench BN, and so forth.

The first lawnmower MW1 is an autonomously traveling lawnmower with a small size and a low speed compared to the second lawnmower MW2.

The autonomously traveling lawnmower is a lawnmower which executes lawn-mowing work while autonomously traveling. The autonomously traveling lawnmower includes a mowing blade disc and can mow lawn grass by the mowing blade disc which is rotated and driven while traveling is performed, for example.

The first lawnmower MW1 corresponds to one example of "first work machine".

The second lawnmower MW2 executes the second lawn-mowing work. The second lawn-mowing work is lawn-mowing work which is different from the first lawn-mowing work and is lawn-mowing work for a vast area. The second lawnmower MW2 is an autonomously traveling lawnmower with a large size and a high speed compared to the first lawnmower MW1. For example, one mowing blade disc is arranged in the first lawnmower MW1, but two mowing blade discs are arranged in a direction orthogonal to an advancing direction, that is, a width direction in the second lawnmower MW2. Further, for example, a traveling speed of the second lawnmower MW2 is two times or more the traveling speed of the first lawnmower MW1. For example, the traveling speed of the second lawnmower MW2 is three times the traveling speed of the first lawnmower MW1.

The second lawnmower MW2 corresponds to one example of "second work machine".

The safety index storage unit 117 stores a safety index DR while associating that with each of the first lawnmowers MW1 and the second lawnmowers MW2. The safety index DR indicates an extent about safety for a person who is present in the work area AR, is expressed by a numerical value as one example in the present embodiment, and exhibits a lower value as the safety is higher.

The safety index DR is set based on at least either one of a size and a weight WT of each of the first lawnmowers MW1 and the second lawnmowers MW2. For example, as the size becomes larger, the safety index DR of the autonomously traveling work machine is set higher. For example, as the weight WT becomes heavier, the safety index DR of the autonomously traveling work machine is set higher.

Further, the safety index DR is set based on a traveling speed VM of each of the first lawnmowers MW1 and the second lawnmowers MW2. The traveling speed VM is a traveling speed in a time when the autonomously traveling work machine is working, for example. For example, as the traveling speed VM becomes higher, the safety index DR of the autonomously traveling work machine is set higher.

Further, the safety index DR is set based on at least either one of a structure and a function of each of the first lawnmowers MW1 and the second lawnmowers MW2. For example, in a case where the autonomously traveling work machine includes a blade like the mowing blade discs of the first lawnmower MW1 and the second lawnmower MW2, the safety index DR of the autonomously traveling work machine is set high.

The safety index DR corresponds to one example of "safety information".

In the present embodiment, a description is made about a case where the "safety information" is the safety index DR, but this is not restrictive. It is sufficient that the "safety information" is information about safety of each of the first lawnmowers MW1 and the second lawnmowers MW2. The "safety information" may be information which indicates whether or not safety is established, for example. Further, the "safety information" may be set based on an input from a user.

The area setting unit 111 sets the first area AR1 and the second area AR2.

The area setting unit 111 sets the first area AR1 and sets an area except the first area AR1 in the work area AR as the second area AR2, for example.

Further, the area setting unit 111 determines whether or not the second lawnmower MW2 is capable of passing through the second area AR2 based on the size of the second lawnmower MW2. Then, in a case where it is determined that the second lawnmower MW2 is not capable of passing through the second area AR2, the second area AR2 through which the second lawnmower MW2 is determined to be not capable of passing is set as the first area AR1 by the area setting unit 111.

In the present embodiment, a description will be made about a case where the area setting unit 111 sets the first area AR1 and sets the area except the first area AR1 in the work area AR as the second area AR2, but this is not restrictive.

It is sufficient that the area setting unit 111 sets the first area AR1 and the second area AR2. For example, the area setting unit 111 may set the second area AR2 and sets an area except the second area AR2 in the work area AR as the first area AR1.

In this case, because the second area AR2 is earlier set in which the second lawnmower MW2 with a large size and a high speed compared to the first lawnmower MW1 performs the lawn-mowing work, the second area AR2 can be set such that the second lawnmower MW2 can efficiently work.

The time calculation unit 112 obtains a first time TW1 which is necessary for one first lawnmower MW1 to execute the first lawn-mowing work in the first area AR1 and a second time TW2 which is necessary for one second lawnmower MW2 to execute the second lawn-mowing work in the second area AR2.

The time calculation unit 112 calculates the first time TW1 based on an area of the first area AR1 and calculates the second time TW2 based on an area of the second area AR2, for example.

Specifically, the time calculation unit 112 calculates the first time TW1 based on the area of the first area AR1, a size of the mowing blade disc of the first lawnmower MW1, the number of mowing blade discs of the first lawnmower MW1, and the traveling speed of the first lawnmower MW1, for example. The time calculation unit 112 calculates the second time TW2 based on the area of the second area AR2, the size of the mowing blade disc of the second lawnmower MW2, the number of mowing blade discs of the second lawnmower MW2, and the traveling speed of the second lawnmower MW2, for example.

Further, the time calculation unit 112 corrects the first time TW1 based on complexity of the first area AR1 and corrects the second time TW2 based on complexity of the second area AR2. The complexity denotes an extent of complexness. The time calculation unit 112 performs correction such that the first time TW1 becomes longer as the complexity of the first area AR1 is higher and performs correction such that the second time TW2 becomes longer as the complexity of the second area AR2 is higher, for example.

Specifically, the time calculation unit 112 decides the complexity of the first area AR1 based on the number of trees TR and the number of benches BN, the trees TR and benches BN being included in the first area AR1, for example. The complexity of the first area AR1 is calculated to be larger as the number of trees TR included in the first area AR1 is greater, and the complexity of the first area AR1 is calculated to be larger as the number of benches BN included in the first area AR1 is greater.

Further, the time calculation unit 112 decides the complexity of the second area AR2 based on complexity of a shape of a periphery of the second area AR2 and on complexity of a shape of a boundary line between the second area AR2 and the first area AR1, for example.

Further, the time calculation unit 112 corrects the first time TW1 based on a quantity of inclinations in the first area AR1 and corrects the second time TW2 based on a quantity of inclinations in the second area AR2. The time calculation unit 112 performs correction such that the first time TW1 becomes longer as the quantity of inclinations in the first area AR is greater and performs correction such that the second time TW2 becomes longer as the quantity of inclinations in the second area AR2 is greater, for example.

Further, the time calculation unit 112 corrects the first time TW1 based on an inclination angle of the first area AR1 and corrects the second time TW2 based on an inclination angle of the second area AR2. The time calculation unit 112 performs correction such that the first time TW1 becomes longer as the inclination angle of the first area AR is greater and performs correction such that the second time TW2 becomes longer as the inclination angle of the second area AR2 is greater, for example.

Based on the first time TW1 and the second time TW2, the machine number calculation unit 113 obtains the number of first lawnmowers MW1 which execute the first lawn-mowing work and the number of second lawnmowers MW2 which execute the second lawn-mowing work. The machine number calculation unit 113 obtains the number of first lawnmowers MW1 and the number of second lawnmowers MW2 such that the lawn-mowing work is completed in a shorter time between the first time TW1 and the second time TW2, for example.

For example, in a case where the first time TW1 is 60 minutes and the second time TW2 is 30 minutes, the machine number calculation unit 113 obtains the number of first lawnmowers MW1 and the number of second lawnmowers MW2 such that the lawn-mowing work is completed in the second time TW2. For example, the machine number calculation unit 113 calculates that the number of first lawnmowers MW1 is two and the number of second lawnmowers MW2 is one.

Further, the machine number calculation unit 113 sets plural combinations of the number of first lawnmowers MW1 and the number of second lawnmowers MW2. Furthermore, the machine number calculation unit 113 calculates the work time TW corresponding to each of the plural combinations. The work time TW is a time necessary for completion of the lawn-mowing work.

Further, the machine number calculation unit 113 calculates the number of workers which corresponds to each of the plural combinations of the number of first lawnmowers MW1 and the number of second lawnmowers MW2.

Further, the machine number calculation unit 113 calculates a cost CT corresponding to each of the plural combinations. The cost CT includes a cost for use of the first lawnmowers MW1 and the second lawnmowers MW2 and a labor cost for laborers.

Further, the first lawnmowers MW1 to be used are selected from usable first lawnmowers MW1 in order of shorter accumulated use times, for example. Further, the second lawnmowers MW2 to be used are selected from usable second lawnmowers MW2 in order of shorter accumulated use times, for example.

The notification unit 114 notifies the first time TW1 and the second time TW2 to the first smartphone 200A which is connected to be capable of communication.

Further, the notification unit 114 notifies the number of first lawnmowers MW1 and the number of second lawnmowers MW2 to the first smartphone 200A which is connected to be capable of communication. Further, the notification unit 114 causes the first smartphone 200A to display the work time TW while associating that with each of the plural combinations of the number of first lawnmowers MW1 and the number of second lawnmowers MW2. Further, the notification unit 114 causes the first smartphone 200A to display the cost CT while associating that with each of the plural combinations of the number of first lawnmowers MW1 and the number of second lawnmowers MW2.

Further, the notification unit 114 causes the first smartphone 200A to display the plural combinations of the number of first lawnmowers MW1 and the number of second lawnmowers MW2 while aligning the plural combinations in predetermined order. The notification unit 114 decides that the predetermined order be preferable order for the user based on at least either one of the work time TW and the cost CT, for example.

A process by the notification unit 114 will further be described with reference to FIG. 3.

Further, for example, the second smartphone 200B may be retained by the worker who performs the lawn-mowing work, and the notification unit 114 may cause the second smartphone 200B to display the first area AR1 and the second area AR2 in mutually different manners. In this case, the worker can easily check the first area AR1 and the second area AR2. Consequently, safety of the worker can be improved.

The manners include colors and patterns, for example. For example, the notification unit 114 causes the first area AR1 to be displayed in blue and causes the second area AR2 to be displayed in red.

Further, for example, the second smartphone 200B may be retained by the worker who performs the lawn-mowing work, and in a case where the second smartphone 200B is positioned in the second area AR2, the notification unit 114 may notify a warning to the second smartphone 200B. In this case, the worker can easily check that the worker himself/herself is located in the second area AR2. Consequently, safety of the worker can be improved.

Figure 2:
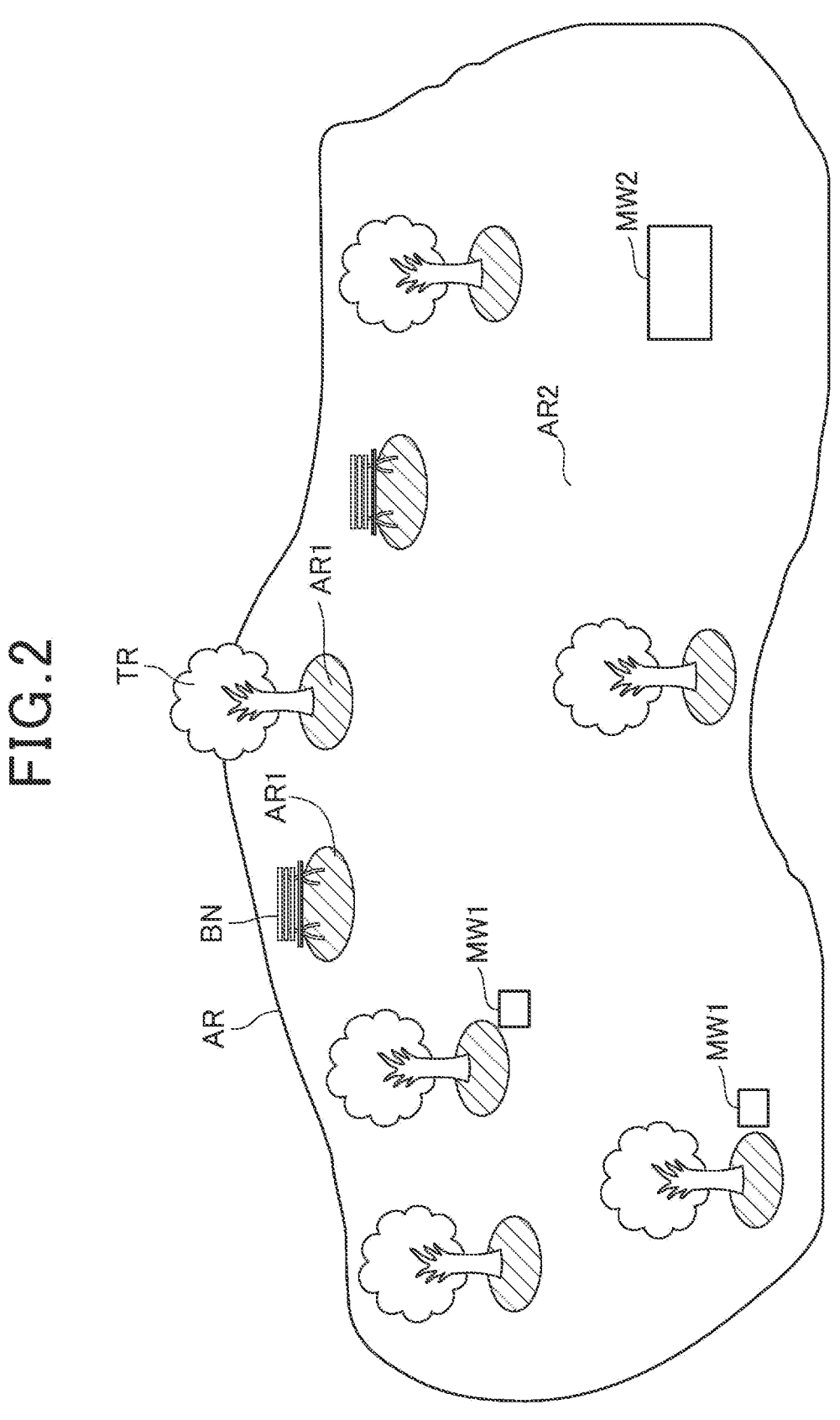
FIG. 2 is a diagram illustrating one example of a work area.

FIG. 2 is a diagram illustrating one example of the work area AR.

As illustrated in FIG. 2, in the work area AR, the trees TR are planted, and the benches BN are arranged.

Further, in the work area AR, the first area AR1 and the second area AR2 are set. The first areas AR are set to the part around the trunk of the tree TR and the part below and around the bench BN. The first areas AR1 are hatched.

Further, in the work area AR, two first lawnmowers MW1 and one second lawnmower MW2 are arranged. Each of the first lawnmowers MW1 is arranged in the part around the trunk of the tree TR. The second lawnmower MW2 is arranged in the second area AR2.

The area setting unit 111 sets, as the first areas AR1, areas for which detailed lawn-mowing work is necessary such as the parts around the trunks of the trees TR and the parts below and around the benches BN, for example. Furthermore, the area setting unit 111 sets the area except the first areas AR1 in the work area AR as the second area AR2.

Consequently, the first area AR1 and the second area AR2 can properly be set.

In the present embodiment, the area setting unit 111 sets, as the first areas AR1, the areas for which detailed lawn-mowing work is necessary such as the part around the trunk of the tree TR and the part below and around the bench BN, but this is not restrictive.

The area setting unit 111 may set the first area AR1 based on an instruction by the user from the smartphone 200, for example. The user may display a map which indicates the work area AR on a touch panel of the smartphone 200, for example, and may designate the first area AR1 via the touch panel. In this case, the first area AR1 desired by the user can be set.

Further, the area setting unit 111 may set a part around an obstacle as the first area AR1 based on the position information of the obstacle included in the map which indicates the work area AR, for example. In this case, the part around the obstacle can be set as the first area AR1.

FIG. 3 is a diagram illustrating one example of a display screen which is displayed on the LCD by the first smartphone 200A. The notification unit 114 of the server device 100 causes the first smartphone 200A to display plural combinations of the number of first lawnmowers MW1 and the number of second lawnmowers MW2 while aligning the plural combinations in predetermined order. Further, the notification unit 114 of the server device 100 causes the first smartphone 200A to display the work time TW and the cost CT while associating those with each of the plural combinations of the number of first lawnmowers MW1 and the number of second lawnmowers MW2.

As illustrated in FIG. 3, a first machine number NM1 as the number of first lawnmowers MW1, a second machine number NM2 as the number of second lawnmowers MW2, the work time TW, a worker number NP, and the cost CT are displayed while being associated with each other.

For example, in a case A, the first machine number NM1 is two, and the second machine number NM2 is one. In this case, the work time TW is 30 minutes, the worker number NP is 2, and the cost CT is 40,000 Yen. The worker number NP is decided by the notification unit 114 based on the first machine number NM1 and the second machine number NM2, for example.

The two workers are configured with a work supervisor and a laborer who monitors actions of two first lawnmowers MW1 and one second lawnmower NM2, for example.

For example, in a case B, the first machine number NM1 is one, and the second machine number NM2 is one. In this case, the work time TW is 60 minutes, the worker number NP is 2, and the cost CT is 50,000 Yen.

The two workers are configured with a work supervisor and a laborer who monitors actions of one first lawnmower MW1 and one second lawnmower NM2, for example.

Further, in the case B, the first machine number NM1 is four, and the second machine number NM2 is two. In this case, the work time TW is 15 minutes, the worker number NP is 3, and the cost CT is 50,000 Yen.

The three workers are configured with a work supervisor, a laborer who monitors actions of three first lawnmowers MW1, and a laborer who monitors an action of one second lawnmower NM2, for example.

As illustrated in FIG. 3, the notification unit 114 lines up the case A to the case C in order of inexpensive costs CT. The order of inexpensive costs CT corresponds to one example of the "predetermined order".

Figure 4:
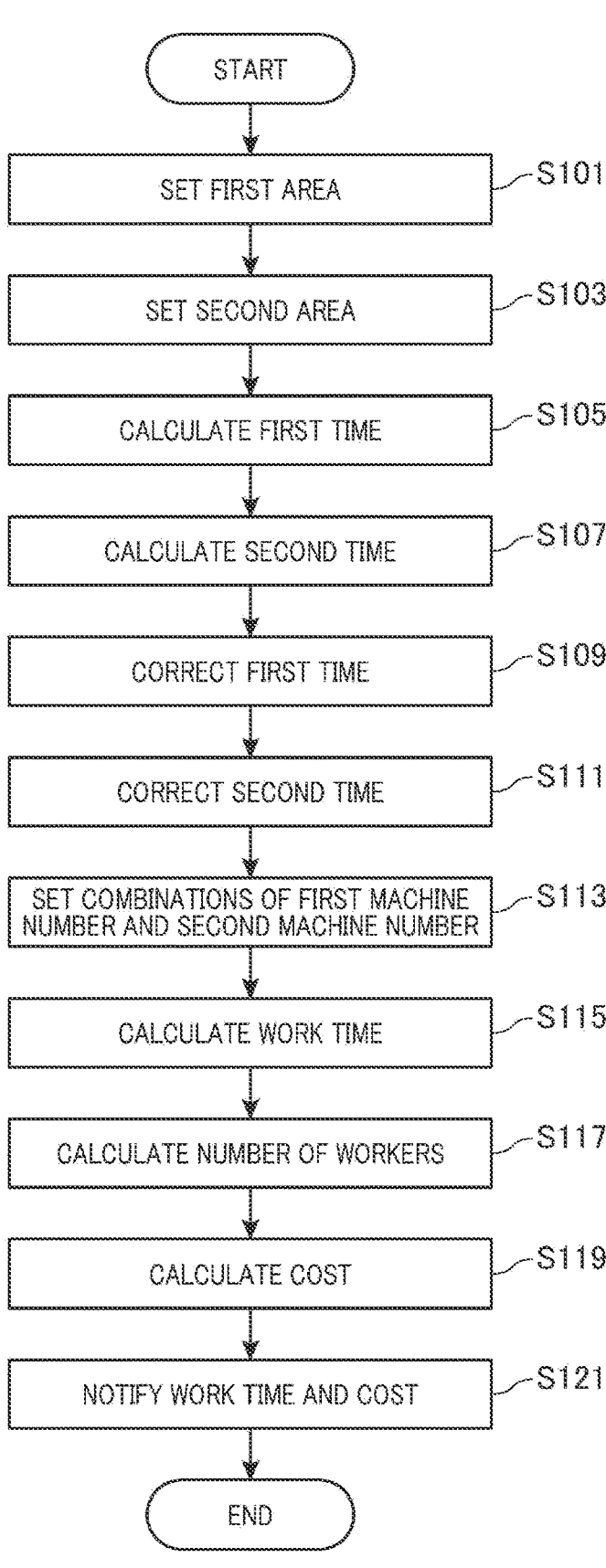
FIG. 4 is a flowchart illustrating one example of a process by a control unit.

FIG. 4 is a flowchart illustrating one example of a process by the control unit 110.

Note that a description will be made about a case where in an initial state in FIG. 4, the control unit 110 accepts, from the first smartphone 200A, a request to notify the number of lawnmowers MW necessary for the lawn-mowing work in the work area AR, the work time TW, and so forth, and information about the work area AR is stored in the work area storage unit 116.

As illustrated in FIG. 4, first, in step S101, the area setting unit 111 sets the first area AR1 in the work area AR.

Next, in step S103, the area setting unit 111 sets the area except the first area AR1 in the work area AR as the second area AR2.

Next, in step S105, the time calculation unit 112 calculates the first time TW1 based on the area of the first area AR1.

Next, in step S107, the time calculation unit 112 calculates the second time TW2 based on the area of the second area AR2.

Next, in step S109, the time calculation unit 112 corrects the first time TW1 based on the complexity of the first area AR1, the quantity of inclinations, and the inclination angles.

Next, in step S111, the time calculation unit 112 corrects the second time TW2 based on the complexity of the second area AR2, the quantity of inclinations, and the inclination angles.

Next, in step S113, the machine number calculation unit 113 sets plural combinations of the first machine number NM1 and the second machine number NM2 based on the first time TW1 and the second time TW2.

Next, in step S115, the machine number calculation unit 113 calculates the work time TW corresponding to each of the plural combinations of the first machine number NM1 and the second machine number NM2.

Next, in step S117, the machine number calculation unit 113 calculates the worker number NP corresponding to each of the plural combinations of the first machine number NM1 and the second machine number NM2.

Next, in step S119, the machine number calculation unit 113 calculates the cost CT corresponding to each of the plural combinations of the first machine number NM1 and the second machine number NM2.

Next, in step S121, the notification unit 114 causes the first smartphone 200A to display the work time TW, the worker number NP, and the cost CT while associating those with each of the plural combinations of the first machine number NM1 and the second machine number NM2. Subsequently, the process is finished.

In such a manner, the notification unit 114 causes the first smartphone 200A to display the work time TW, the worker number NP, and the cost CT while associating those with each of the plural combinations of the first machine number NM1 and the second machine number NM2. Thus, the first user carrying the first smartphone 200A can check the work time TW, the worker number NP, and the cost CT which correspond to each of the plural combinations of the first machine number NM1 and the second machine number NM2. Consequently, based on the work time TW and the cost CT, the first user can decide a desired combination from the plural combinations. As a result, convenience for the user can be improved.

As described above, the server device 100 according to the present embodiment includes: the area setting unit 111 which sets the first area AR1 in which the first lawnmower MW1 executes the first lawn-mowing work in the work area AR and the second area AR2 in which the second lawnmower MW2 executes the second lawn-mowing work in the work area AR; the time calculation unit 112 which obtains the first time TW1 necessary for the first lawnmower MW1 to execute the first lawn-mowing work in the first area AR1 and the second time TW2 necessary for the second lawnmower MW2 to execute the second lawn-mowing work in the second area AR2; and the notification unit 114 which notifies the first time TW1 and the second time TW2 to the smartphone 200 connected to be capable of communication.

That is, the first time TW1 necessary for executing the first lawn-mowing work in the first area AR1 and the second time TW2 necessary for executing the second lawn-mowing work in the second area AR2 are notified to the smartphone 200.

Thus, the server device 100 can notify the first time TW1 and the second time TW2 to the smartphone 200. Consequently, based on the first time TW1 and the second time TW2, the user carrying the smartphone 200 is enabled to check the number of first lawnmowers MW1 and the number of second lawnmowers MW2, the first lawnmowers MW1 and second lawnmowers MW2 being necessary for the lawn-mowing work in the work area AR.

Further, in the server device 100, the second lawnmower MW2 has a larger size than the first lawnmower MW1.

Consequently, the lawn-mowing work in the work area AR is executed by combining the first lawnmower MW1 and the second lawnmower MW2 having a larger size than the first lawnmower MW1, and the lawn-mowing work in the work area AR can thereby efficiently be executed.

Further, in the server device 100, the safety index DR is stored which indicates an extent of safety of the first lawnmower MW1 and the second lawnmower MW2 for a person present in the work area AR, and the first lawnmower MW1 is a lawnmower with higher safety than the second lawnmower MW2.

Consequently, the lawn-mowing work in the work area AR is executed by combining the second lawnmower MW2 and the first lawnmower MW1 with higher safety than the second lawnmower MW2, and the lawn-mowing work in the work area AR can thereby safely be executed.

Further, in the server device 100, the second lawnmower MW2 executes the second lawn-mowing work while autonomously traveling.

Thus, a worker is not necessary who operates or drives the second lawnmower MW2. Consequently, the number of workers necessary for executing the lawn-mowing work in the work area AR can be reduced.

Further, in the server device 100, the area setting unit 111 sets the first area AR1 and sets the area except the first area AR1 in the work area AR as the second area AR2.

Consequently, because the first area AR1 in which the first lawnmower MW1 with a small size and a low speed compared to the second lawnmower MW2 performs the lawn-mowing work is earlier set than the second area AR2, the first area AR1 can be set such that the first lawnmower MW1 can properly perform detailed work.

Further, in the server device 100, the area setting unit 111 may set the first area AR1 based on the instruction by the user about the map of the work area AR, the map being displayed on the smartphone 200.

In this case, the first area AR1 desired by the user can be set.

Further, in the server device 100, the position information of the obstacle arranged in the work area AR may be stored, and the area setting unit 111 may set the first area AR1 based on the position information of the obstacle.

In this case, the first area AR1 can be set based on the position information of the obstacle.

Further, in the server device 100, the area setting unit 111 sets the second area AR2 and sets the area except the second area AR2 in the work area AR as the first area AR1.

Consequently, because the second area AR2 in which the second lawnmower MW2 with a large size and a high speed compared to the first lawnmower MW1 performs the lawn-mowing work is earlier set than the first area AR1, the second area AR2 can be set such that the second lawnmower MW2 can efficiently work.

Further, in the server device 100, the area setting unit 111 determines whether or not the second lawnmower MW2 is capable of passing through the second area AR2 based on the size of the second lawnmower MW2, and in a case where a determination is made that the second lawnmower MW2 is not capable of passing through the second area AR2, the area setting unit 111 sets the second area AR2 through which the second lawnmower MW2 is determined to be not capable of passing as the first area AR1.

Consequently, because the second area AR2 through which the second lawnmower MW2 is determined to be not capable of passing is set as the first area AR1, the first area AR1 and the second area AR2 can properly be set.

Further, in the server device 100, the first lawnmower MW1 executes the first lawn-mowing work while autonomously traveling, the second lawnmower MW2 executes the second lawn-mowing work while autonomously traveling, and the time calculation unit 112 calculates the first time TW1 based on the area of the first area AR1 and calculates the second time TW2 based on the area of the second area AR2.

That is, each of the first lawnmower MW1 and the second lawnmower MW2 is an autonomously traveling lawnmower. Consequently, because the first time TW1 is calculated based on the area of the first area AR1 and the second time TW2 is calculated based on the area of the second area AR2, the first time TW1 and the second time TW2 can properly be calculated.

Further, in the server device 100, the first lawnmower MW1 executes the first lawn-mowing work while the worker is moving, and the time calculation unit 112 calculates the first time TW1 based on a moving time of the worker.

Consequently, because the first lawnmower MW1 is a lawnmower which executes the first lawn-mowing work while the worker is moving and the first time TW1 is calculated based on the moving time of the worker, the first time TW1 can properly be calculated.

Further, in the server device 100, the time calculation unit 112 corrects the first time TW1 based on the complexity of the first area AR1 and corrects the second time TW2 based on the complexity of the second area AR2, and the complexity denotes the extent of complexness.

As the complexity of the area becomes higher, the work time becomes longer. Consequently, because the first time TW1 is corrected based on the complexity of the first area AR1 and the second time TW2 is corrected based on the complexity of the second area AR2, the first time TW1 and the second time TW2 can properly be corrected.

Further, in the server device 100, the time calculation unit 112 corrects the first time TW1 based on the quantity of inclinations in the first area AR1 and corrects the second time TW2 based on the quantity of inclinations in the second area AR2.

As the quantity of inclinations in the area becomes greater, the work time becomes longer. Consequently, because the first time TW1 is corrected based on the quantity of inclinations in the first area AR1 and the second time TW2 is corrected based on the quantity of inclinations in the second area AR2, the first time TW1 and the second time TW2 can properly be corrected.

Further, in the server device 100, the server device 100 includes the machine number calculation unit 113 which obtains the number of first lawnmowers MW1 and the number of second lawnmowers MW2 based on the first time TW1 and the second time TW2, and the notification unit 114 notifies the number of first lawnmowers MW1 and the number of second lawnmowers MW2 to the smartphone 200.

Consequently, because the number of first lawnmowers MW1 and the number of second lawnmowers MW2 are notified to the smartphone 200, the user can check the number of first lawnmowers MW1 and the number of second lawnmowers MW2, the first lawnmowers MW1 and second lawnmowers MW2 being necessary for the lawn-mowing work in the work area AR.

Further, in the server device 100, the machine number calculation unit 113 obtains the number of first lawnmowers MW1 and the number of second lawnmowers MW2 such that the lawn-mowing work is completed in the shorter time between the first time TW1 and the second time TW2.

Consequently, because the number of first lawnmowers MW1 and the number of second lawnmowers MW2 are obtained such that the lawn-mowing work is completed in the shorter time between the first time TW1 and the second time TW2, the number of first lawnmowers MW1 and the number of second lawnmowers MW2 can properly be calculated.

Further, in the server device 100, the machine number calculation unit 113 sets plural combinations of the number of first lawnmowers MW1 and the number of second lawnmowers MW2, and the notification unit 114 causes the smartphone 200 to display the plural combinations while aligning the plural combinations in predetermined order.

Thus, because the smartphone 200 is caused to display the plural combinations of the number of first lawnmowers MW1 and the number of second lawnmowers MW2 while aligning the plural combinations in the predetermined order, the user can select a desired combination from the plural combinations. Consequently, convenience for the user can be improved. Further, the predetermined order is properly set, and convenience for the user can thereby be improved.

Further, in the server device 100, the machine number calculation unit 113 calculates the work time TW corresponding to each of the plural combinations, the notification unit 114 causes the smartphone 200 to display the work time TW while associating the work time TW with each of the plural combinations, and the work time TW denotes a time necessary for completion of the lawn-mowing work.

Thus, because the smartphone 200 is caused to display the work time TW while associating the work time TW with each of the plural combinations of the number of first lawnmowers MW1 and the number of second lawnmowers MW2, the user can properly select a desired combination from the plural combinations. Consequently, convenience for the user can be improved.

Further, in the server device 100, the machine number calculation unit 113 calculates the cost CT corresponding to each of the plural combinations, and the notification unit 114 causes the smartphone 200 to display the cost CT while associating the cost CT with each of the plural combinations.

Thus, because the smartphone 200 is caused to display the cost CT while associating the cost CT with each of the plural combinations of the number of first lawnmowers MW1 and the number of second lawnmowers MW2, the user can properly select a desired combination from the plural combinations. Consequently, convenience for the user can be improved.

Further, in the server device 100, the machine number calculation unit 113 calculates the number of workers which corresponds to each of the plural combinations, and the notification unit 114 causes the smartphone 200 to display the number of workers while associating the number of workers with each of the plural combinations.

Thus, because the smartphone 200 is caused to display the number of workers while associating the number of workers with each of the plural combinations of the number of first lawnmowers MW1 and the number of second lawnmowers MW2, the user can properly select a desired combination from the plural combinations. Consequently, convenience for the user can be improved.

Further, in the server device 100, the smartphone 200 may be retained by the worker who performs the gardening work, and the notification unit 114 may cause the smartphone 200 to display the first area AR1 and the second area AR2 in mutually different manners.

In this case, the worker can easily check the first area AR1 and the second area AR2. Consequently, safety of the worker can be improved.

Further, in the server device 100, the smartphone 200 may be retained by the worker who performs the gardening work, and in a case where the smartphone 200 is positioned in the second area AR2, the notification unit 114 may notify the warning to the smartphone 200.

The worker can easily check that the worker himself/ herself is located in the second area AR2. Consequently, safety of the worker can be improved.

The present invention is not limited to the configurations of the above embodiment but can be carried out in various forms without departing from the scope of the gist thereof.

For example, in the present embodiment, a description is made about a case where the "gardening work" is lawn-mowing work, but this is not restrictive. The "gardening work" may be work other than lawn-mowing work.

Further, in the present embodiment, a description is made about a case where lawn-mowing work is executed by the first lawnmower MW1 and the second lawnmower MW2, but this is not restrictive. It is sufficient that lawn-mowing work is executed by plural kinds of lawnmowers including the first lawnmower MW1 and the second lawnmower MW2.

For example, lawn-mowing work may be executed by the first lawnmower MW1, the second lawnmower MW2, and a third lawnmower. The third lawnmower is a lawnmower whose travel is operated by the worker while the worker is walking, for example.

Further, for example, lawn-mowing work may be executed by the first lawnmower MW1, the second lawn-mower MW2, the third lawnmower, and a fourth work machine. The fourth work machine is a work machine which executes finishing work, for example.

Further, in the present embodiment, a description is made about a case where the first work machine (first lawnmower MW1) is an autonomously traveling gardening work machine (lawnmower), but this is not restrictive. The first work machine may be a work machine which executes first gardening work by being operated by the user.

As one example, the first work machine may be a work machine which executes the first gardening work while the worker is moving. Specifically, the first work machine may be a work machine, such as a walking type lawnmower, by which the user walks to perform work while operating the work machine from the rear of the work machine or may be a work machine of a type which is operated while the user rides on the work machine, such as a riding type lawnmower. Further, the first work machine may be a work machine, by which the user performs work while holding the work machine by a hand, such as a hand-held type strimmer, blower, or edge trimmer. Further, the first work machine may be a remote-controlled work machine which performs work while the user operates the work machine by a remote controller in a position close to the work machine or may be a work machine which performs work while a remote-controlled operation and autonomously traveling work are appropriately switched.

As the first work machines raised in the above, even in a case where the work is performed while the user is positioned adjacently to the first work machine, the user checks the smartphone 200 retained by the user himself/herself or accepts a notification from the smartphone 200 and can thereby perform work by the first work machine in a zone in which a possibility to contact with the second work machine is low, and safety of the first gardening work can be improved.

Further, in a case where the first lawnmower MW1 is a work machine which executes the first gardening work by being operated by the user, further detailed work can be executed compared to a case where the first lawnmower MW1 is an autonomously traveling lawnmower.

Further, the first work machine may be a remotely operated work machine in which a camera is mounted on the first work machine and which is maneuvered while the user is checking an image by the camera from a remote place. Such a work machine has a problem with perception of presence of peripheral objects by the user, but such a work machine is maneuvered while the user is checking a terminal by using the present system and can thereby effectively reduce a risk of contact with the second work machine.

Further, in the present embodiment, a description is made about a case where the second work machine (second lawnmower MW2) is an autonomously traveling gardening work machine (lawnmower), but this is not restrictive. For example, it can be assumed that the second work machine is a work machine with a larger size than the first work machine (for example, a work machine with high work efficiency such as a large size or a high work speed).

Specifically, the second work machine may be a riding type lawnmower on which the worker rides and which the worker drives, may be a remote-controlled and large-sized work machine which performs work while the user operates a remote controller in a position close to the work machine, or may be a large-sized work machine which performs work while a remote-controlled operation and autonomously traveling work are appropriately switched.

Such a large-sized work machine causes large damage when that contacts with the first work machine or the worker who operates the first work machine compared to a small-sized work machine; however, as in the present system, the large-sized work machine is caused not to work in the same area as the first work machine by setting the first area AR1 and the second area AR2, a possibility of contact can thereby be reduced, and safety of the work can be improved.

Further, in the present embodiment, a description is made about a case where the server device 100 performs a notification to the smartphone 200, but this is not restrictive. A notification may be performed to the smartphone 200 by an information processing device such as a personal computer.

Further, in the present embodiment, a description is made about a case where the "terminal device" is the smartphone 200, but this is not restrictive. The "terminal device" may be a personal computer or may be a tablet terminal.

Further, at least a part of the function blocks illustrated in FIG. 1 may be realized with hardware or may be configured to be realized in cooperation between hardware and software, and the function blocks are not limited to a configuration in which independent hardware resources are arranged as illustrated in FIG. 1.

Further, the control program 115 executed by the server device 100 may be stored in another storage unit in the memory. Further, a configuration is possible in which the control program 115 stored in an external device is acquired via a communication unit or the like and is executed.

Further, process units in the flowchart illustrated in FIG. 4 are process units resulting from division corresponding to main process contents for easy understanding of the process by the server device 100. Embodiments are not restricted by a manner for dividing the process units illustrated in the flowchart illustrated in FIG. 4 or names of those. Further, the process by the server device 100 can be divided into more process units in accordance with process contents, and one process unit can also be divided to include more processes. Further, process order of the above flowchart is not limited to the illustrated example.

REFERENCE SIGNS LIST 1 gardening assistance system
100 server device
110 control unit
110A processor
110B memory
111 area setting unit
112 time calculation unit
113 machine number calculation unit
114 notification unit
115 control program
116 work area storage unit
200 smartphone (terminal device)
200A first smartphone
200B second smartphone
200C third smartphone
AR work area
AR1 first area
AR2 second area
BN bench
CT cost
MW1 first lawnmower (first work machine)
MW2 second lawnmower (second work machine)
NM1 first machine number
NM2 second machine number
NP worker number
TR tree
TW work time
TW1 first time
TW2 second time

The invention claimed is:

1. A gardening assistance system, comprising:
a server device connected with a terminal device via a network to be capable of communication with the terminal device;
a first work machine; and
a second work machine, the gardening assistance system making the first work machine and the second work machine execute first gardening work and second gardening work, respectively, the server device comprising a processor that is configured to:
set a first area in which the first work machine executes the first gardening work in a work area and a second area in which the second work machine executes second gardening work in the work area;
obtains a first time necessary for one first work machine to execute the first gardening work in the first area and a second time necessary for one second work machine to execute the second gardening work in the second area;
display the first time and the second time to the terminal device; and
obtain a number of first work machines and a number of second work machines based on the first time and the second time, wherein
the second work machine has a larger size than the first work machine, the processor determines whether or not the second work machine is capable of passing through the second area based on a size of the second work machine,
in a case where a determination is made that the second work machine is not capable of passing through the second area, the processor sets the second area through which the second work machine is determined to be not capable of passing as the first area,
the processor obtains the number of first work machines and the number of second work machines such that gardening work is completed in a shorter time between the first time and the second time, and
the processor displays the number of first work machines and the number of second work machines to the terminal device.

2. The gardening assistance system according to claim 1, wherein
the processor sets plural combinations of the number of first work machines and the number of second work machines, and
the processor causes the terminal device to display the plural combinations while aligning the plural combinations in predetermined order.

3. The gardening assistance system according to claim 2, wherein
the processor calculates a work time corresponding to each of the plural combinations,
the processor causes the terminal device to display the work time while associating the work time with each of the plural combinations, and
the work time denotes a time necessary for completion of gardening work.

4. The gardening assistance system according to claim 2, wherein
the processor calculates a cost corresponding to each of the plural combinations, and
the processor causes the terminal device to display the cost while associating the cost with each of the plural combinations.

5. The gardening assistance system according to claim 2, wherein
the processor calculates a number of workers which corresponds to each of the plural combinations, and
the processor causes the terminal device to display the number of workers while associating the number of workers with each of the plural combinations.

6. The gardening assistance system according to claim 1, wherein
the terminal device is retained by a worker who performs gardening work, and
the processor causes the terminal device to display the first area and the second area in mutually different manners.

7. The gardening assistance system according to claim 1, wherein
the terminal device is retained by a worker who performs gardening work, and
in a case where the terminal device is positioned in the second area, the processor notifies a warning to the terminal device.

8. The gardening assistance system according to claim 1, wherein
safety information is stored which indicates safety of work of the first work machine and the second work machine, and
the first work machine is a work machine with higher safety than the second work machine.

9. The gardening assistance system according to claim 1, wherein the second work machine executes the second gardening work while autonomously traveling.

10. The gardening assistance system according to claim 1, wherein the processor sets the first area and sets an area except the first area in the work area as the second area.

11. The gardening assistance system according to claim 10, wherein the processor sets the first area based on an instruction by a user about a map of the work area, the map being displayed on the terminal device.

12. The gardening assistance system according to claim 10, wherein position information of an obstacle arranged in the work area is stored, and the processor sets the first area based on the position information of the obstacle.

13. The gardening assistance system according to claim 1, wherein the processor sets the second area and sets an area except the second area in the work area as the first area.

14. The gardening assistance system according to claim 1, wherein the first work machine executes the first gardening work while autonomously traveling, the second work machine executes the second gardening work while autonomously traveling, and the processor calculates the first time based on an area of the first area and calculates the second time based on an area of the second area.

15. The gardening assistance system according to claim 14, wherein the processor corrects the first time based on complexity of the first area and corrects the second time based on complexity of the second area, and the complexity denotes an extent of complexness.

16. The gardening assistance system according to claim 1, wherein the processor corrects the first time based on a quantity of inclinations in the first area and corrects the second time based on a quantity of inclinations in the second area.

17. The gardening assistance system according to claim 14, wherein the terminal device is retained by a worker who performs gardening work, and in a case where the terminal device is positioned in the second area, the processor notifies a warning to the terminal device.

* * * * *